United States Patent
Doran

[11] Patent Number: 5,918,188
[45] Date of Patent: Jun. 29, 1999

[54] FLIP ON/OFF DETECTOR

[75] Inventor: Robert A. Doran, Cary, N.C.

[73] Assignee: Ericsson Inc., Research Triangle Park, N.C.

[21] Appl. No.: 08/722,680

[22] Filed: Sep. 30, 1996

[51] Int. Cl.$^6$ .............................. H04M 1/02; H04B 1/38
[52] U.S. Cl. ............................ 455/575; 455/90; 379/433
[58] Field of Search ..................... 455/575, 90; 379/428, 379/433

[56] References Cited

U.S. PATENT DOCUMENTS

| 5,216,246 | 6/1993 | Weldman et al. | 250/229 |
| 5,327,584 | 7/1994 | Adachi et al. | 455/575 |
| 5,542,105 | 7/1996 | Finch et al. | 455/90 |
| 5,668,867 | 9/1997 | Nagai | 379/433 |
| 5,706,332 | 1/1998 | Nagai | 455/90 |

FOREIGN PATENT DOCUMENTS

| 0 339 212 | 11/1989 | European Pat. Off. . |
| 0 379 732 | 8/1990 | European Pat. Off. . |
| 0 534 478 | 3/1993 | European Pat. Off. . |
| 0 661 824 | 7/1995 | European Pat. Off. . |
| 29 09 293 | 9/1980 | Germany . |
| WO 92 17974 | 10/1992 | WIPO . |

OTHER PUBLICATIONS

Patent Abstracts of Japan, vol. 012, No. 094 (E–593), Mar. 26, 1988 & JP 62 226748 A (NEC Corp), Oct. 5, 1987, see Abstract.

*Primary Examiner*—Willis R. Wolfe
*Attorney, Agent, or Firm*—Nixon & Vanderhye P.C.

[57] ABSTRACT

A sensor unit for an electronic device having a pivotable cover member includes a signal emitter, a signal receiver spaced from the signal emitter, and a baffle attached to the cover member and disposed in the space between the signal emitter and the signal receiver when the cover is in its closed position. A transmit window disposed between the signal emitter and the signal receiver is permeable to signals falling within a specified wavelength range, thereby ensuring the accuracy of the signal. When the sensor unit is applied to a cellular phone, for example, the phone can be automatically in an "off hook" or "on hook" condition automatically in accordance with whether the cover member is in its open position or closed position, and an operator need only perform a single operation to answer or terminate a call or to power up the phone.

16 Claims, 3 Drawing Sheets

FLIP ON/OFF DETECTOR

BACKGROUND

The present invention relates generally to electronic devices having a cover assembly that is pivotable between an open position and a closed position and, more particularly, to a flip cover sensor unit for a cellular phone that senses opening or closing of the flip cover.

Many portable cellular phone designs include a cover member that covers the key pad and/or other features of the phone when not in use. Known cover members include those that are hinged to the phone housing and those that slide over the phone housing. The cover member (often called a "flip") protects its covered features from contaminants such as dirt and the like.

In operation, it is advantageous for the phone to automatically enter an "off-hook" condition or return to an "on-hook" condition when the flip cover is open or closed, respectively. The operation of opening or closing the flip should serve as an indication that the user wants to initiate or answer a call when opening the flip cover or terminate a call when closing the flip cover. It is thus necessary to provide a mechanism to alert the phone that the flip cover is either opening or closing, without requiring the user to perform a second operation, such as pushing a power button or switch.

It has been known to provide a sensing mechanism that senses flip cover opening and closing. Typically, these mechanisms include a magnet in the cover member and a Reed switch or Hall effect switch in the main terminal body. Displacement of the cover member by a user activates the switch to produce a phone off-hook condition. A user can thus answer an incoming call simply by displacing the cover member without having to perform any additional steps. These switches, however, are typically quite expensive and have limited life spans. In addition, the switches are particularly sensitive to shock loads.

SUMMARY OF THE INVENTION

It is therefore an object of the invention to provide a sensor unit for detecting opening and closing of a cover member in an electronic device such as a cellular phone that overcomes the drawbacks noted above with respect to conventional sensors.

The sensor unit according to the invention utilizes a light source or the like, an optical detector and a strategically placed obstruction or baffle on the flip cover. The light source and detector are mounted to a printed circuit board (PCB) in the main terminal body. When the phone is powered, the light source transmits light at a specific frequency. The baffle prevents light from activating the is detector when the flip is closed. When the flip is open, the baffle is moved to allow the light to transmit to the detector. If the detector filter receives light at the specified frequency, the phone is put in an off-hook condition. If the detector filter receives no light at the specified frequency, the phone remains in an on-hook or stand-by condition.

In one embodiment, a transmit window mounted in the terminal body separates a light-emitting diode (LED) from an optical detector. When unobstructed, light travels from the LED through the transmit window to the detector. When the flip cover is closed, the baffle blocks light from the detector by seating in a groove formed in the transmit window. In a second arrangement, while the flip cover is open, light travels from the LED and is reflected from a surface on the flip cover to the detector. In another arrangement, opening of the flip cover reveals an LED extending outside of the terminal body that transmits light to the detector. The flip may include a window or opening directly over the LED for visually signaling an "off-hook" condition.

In accordance with one aspect of the invention, these and other objects of the present invention are achieved by providing a sensor unit for a cellular phone having a cover member attached to a phone housing and pivotable between an open position and a closed position. The sensor unit includes a signal emitter attached to the phone housing, a signal receiver attached to the phone housing and spaced from the signal emitter, and a baffle attached to the cover member and disposed in the spaced between the signal emitter and the signal receiver when the cover is in the closed position. The sensor unit may further include a transmit window attached to the phone housing between the signal emitter and the signal receiver. In this regard, the transmit window preferably includes a groove therein shaped corresponding to the baffle for receiving the baffle in the closed position. The transmit window is preferably formed of a material that allows about 85% transmission of wavelengths between about 890 nm and about 940 nm. The material also preferably limits transmission below about 850 nm and above about 980 nm to 5%. One preferred material for the transmit window is LEXAN plastic. In one arrangement, the signal emitter is an LED indicator.

When the cover member is in the open position, the signal emitter communicates with the signal receiver. In this context, the signal emitter may bounce a signal off of the cover toward the signal receiver when the cover member is in the open position.

In accordance with another aspect of the invention, there is provided a cellular phone including a phone housing, a cover member attached to the phone housing and pivotable between an open position and a closed position, and a signal unit disposed between the phone housing and the cover member that indicates whether the cover member is in the open position or the closed position.

BRIEF DESCRIPTION OF THE DRAWINGS

These and other aspects and advantages of the invention will be described in detail with reference to the accompanying drawings, in which.

DETAILED DESCRIPTION OF PREFERRED EMBODIMENTS

Figure 1:
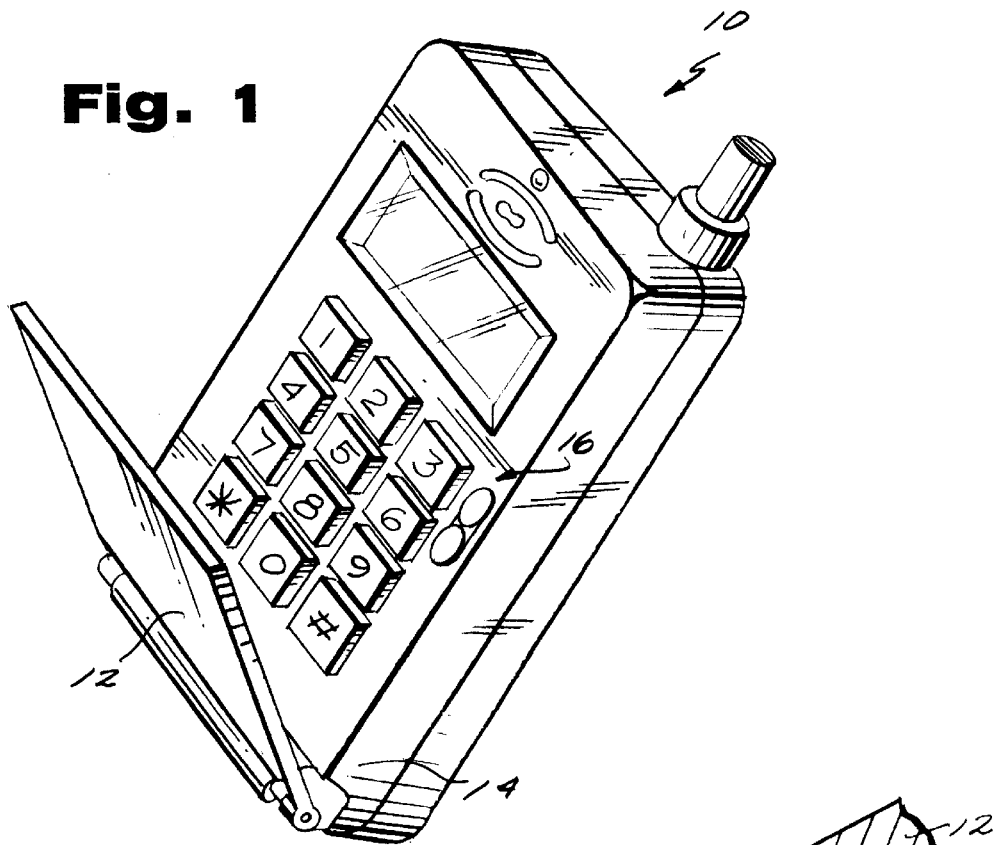
FIG. 1 is a perspective view of a cellular phone including a flip cover.

FIG. 1 is a perspective view of a cellular phone 10 including a cover member 12 attached to the phone housing 14. The cover member or flip cover 12 is pivotable between an open position in which the phone is typically in an off-hook condition, and a closed position in which the phone is typically in an on-hook condition. A sensor unit 16 attached to the phone senses whether the flip cover 12 is in the open position or the closed position.

Although the invention is described in conjunction with a cellular phone, the invention is equally applicable to any electronic device utilizing a pivotable cover member. Those of ordinary skill in the art will contemplate alternative uses of the structure according to the invention that fall within the scope of the invention. The invention is thus not meant to be limited to a cellular phone.

Figure 2:
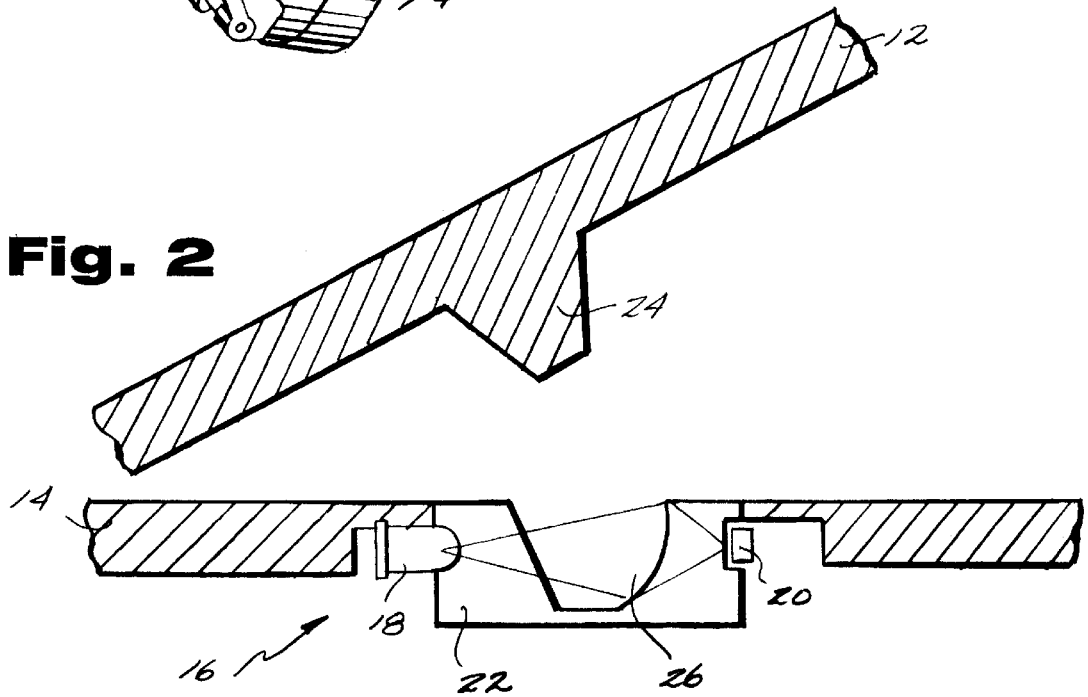
FIG. 2 illustrates the sensor unit according to the present invention with the cover member in its open position.

Referring to FIG. 2, the sensor unit 16 according to the invention includes a signal emitter 18 attached to the phone housing 14 and a signal receiver 20 attached to the phone housing 14 and spaced from the signal emitter 18. A transmit window 22 is secured to the phone housing 14 in the space between the signal emitter 18 and the signal receiver 20. A baffle 24 that is attached or formed integral with the cover member 12 fits in a groove 26 formed in the transmit window 22 when the cover member is in the closed position.

The signal emitter 18 is preferably an LED, however, any light source may be utilized such as laser or incandescent light or the like. The signal emitter 18 transmits radiation at a specific wavelength (preferably about 915 nm) and a specific frequency (preferably between about 2 Hz and 100 kHz). When the cover member 12 is in the open position, the radiation passes through the transmit window 22, which is produced of a material to provide band pass properties to allow the radiation to be transmitted at a more specific wavelength. The transmit window is preferably formed of an injection moldable material such as LEXAN plastic with pigment added to allow the required narrow band pass properties. In this context, the material preferably provides about 85% transmission of wavelengths between 890 nm and 940 nm. In addition, the material limits the transmission below 850 nm and above 980 nm to about 5%.

When the cover member 12 is in the open position, the baffle 24 is separated from the groove 26, and the signal receiver 20 receives the signal from the signal emitter 18. The signal receiver 20 then communicates with the phone controller indicating that the flip cover 12 is open. The signal receiver 20 is configured such that if it receives a signal having a wavelength outside of a predetermined range such as between 890 nm and 940 nm, the receiver 20 recognizes the signal as an improper signal, and the receiver 20 does not indicate the cover open position to the phone controller.

The signal emitter 18 and signal receiver 20 are coupled with the phone PCB and have a conventional optical switch configuration. The details of the electrical circuits effecting their operation will therefore not be described. Those of ordinary skill in the art will contemplate alternative signal emitter and signal receiver arrangements that are suitable for the structure according to the present invention, and the invention is not meant to be limited to an optical type switch.

Figure 3:
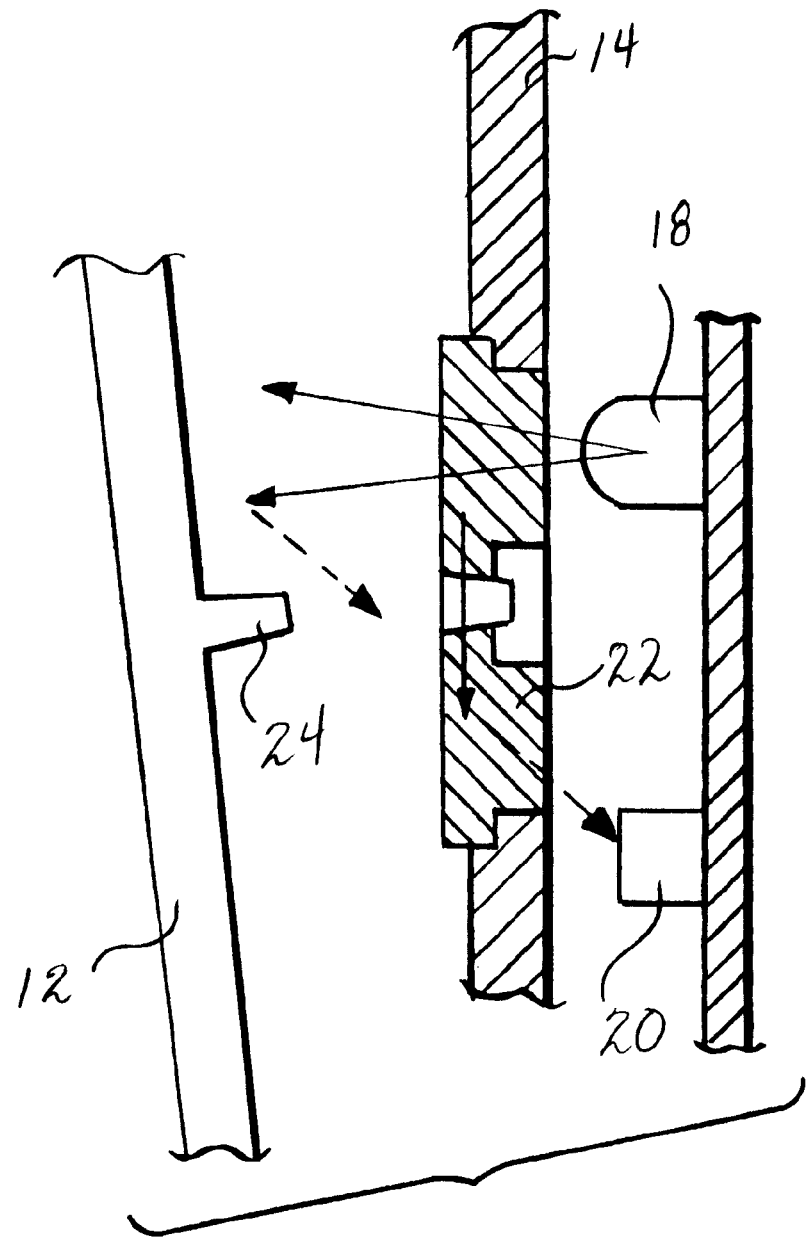
FIG. 3 illustrates an alternative embodiment of the sensor unit according to the invention.

In an alternative embodiment, shown in FIG. 3, the signal emitter 18 emits a signal toward the cover member 12, which, similar to the first embodiment, blocks the signal with the baffle 24 when the cover member 12 is in the closed position, and the signal is reflected by the cover member 12 toward the signal receiver 20. In this embodiment, the signal emitter 18 may or may not also emit signals directly toward the signal receiver 20. In one arrangement, the signal emitter 18 is disposed substantially perpendicular to the phone housing 14, and the transmit window 22 includes a diffuse surface to produce a diffused spatial pattern perpendicular to the transmit window 22. As a result, a portion of the energy is transmitted laterally to the signal receiver 20.

Figure 4:
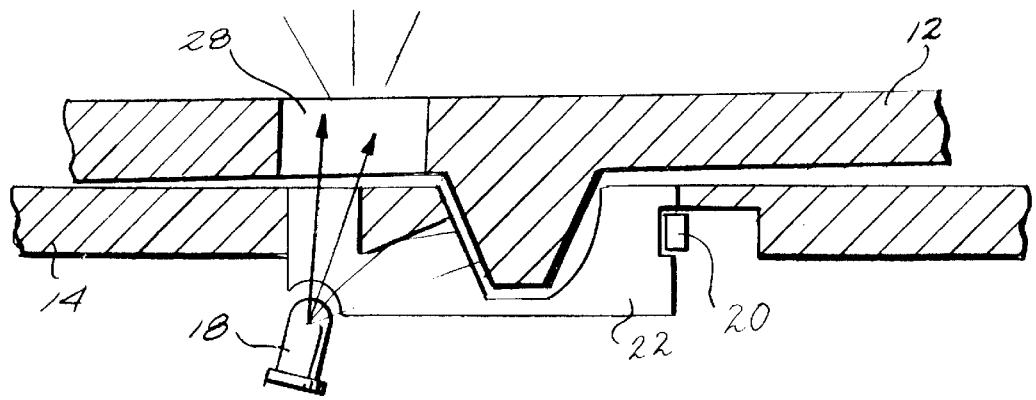
FIG. 4 illustrates another alternative embodiment of the sensor unit according to the invention with the cover member in its closed position.
Figure 5:
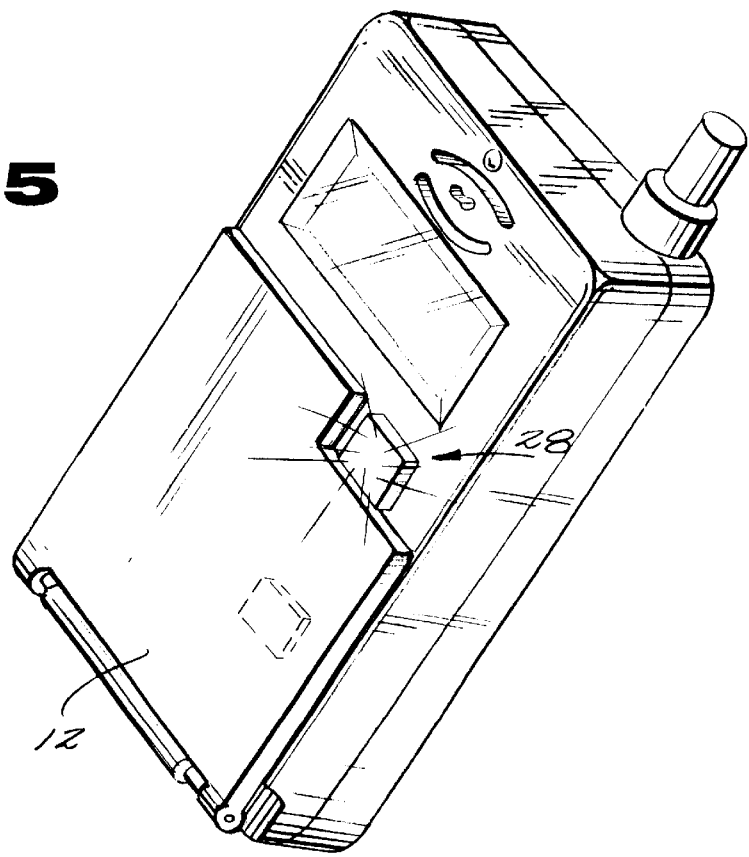
FIG. 5 is a perspective view of a cellular phone incorporating yet another alternative embodiment according to the present invention.

In still another alternative embodiment as shown in FIG. 4, the signal emitter is disposed within the phone housing 14, and the cover member 12 includes an LED exit opening 28. In this embodiment, the signal emitter 18 can thus additionally be used as an LED indicator, visually signaling an "off-hook" condition. As shown in FIG. 5, the LED exit opening 28 may comprise a cut out in the cover member 12.

The sensor unit according to the invention provides a reliable and inexpensive detector for signaling the opening and closing of the phone flip cover. By virtue of this structure, a user can power up a phone or answer or terminate a call in a single step operation.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A sensor unit for a cellular phone having a cover member attached to a phone housing and pivotable between an open position and a closed position, the sensor unit comprising:
    a signal emitter attached to the phone housing;
    a signal receiver attached to the phone housing and spaced from said signal emitter;
    a baffle attached to the cover member and disposed in the space between said signal emitter and said signal receiver when the cover is in the closed position, and
    a transmit window attached to the phone housing between said signal emitter and said signal receiver wherein said transmit window is formed of a material having narrow band pass properties.

2. A sensor unit according to claim 1, wherein said transmit window comprises a groove therein shaped substantially corresponding to said baffle for receiving said baffle in the closed position.

3. A sensor unit according to claim 1, wherein said transmit window is formed of LEXAN plastic.

4. A sensor unit according to claim 1, wherein said signal emitter is an LED indicator.

5. A sensor unit according to claim 1, wherein said transmit window is formed of a material that allows about 85% transmission of wavelengths between about 890 nm and about 940 nm.

6. A sensor unit according to claim 5, wherein said transmit window is formed of a material that limits transmission below about 850 nm and above about 980 nm to 5%.

7. A sensor unit according to claim 1, wherein said signal emitter communicates with said signal receiver when the cover member is in the open position.

8. A sensor unit according to claim 7, wherein said signal emitter bounces a signal off of the cover member toward said signal receiver when the cover member is in the open position.

9. A cellular phone comprising:
    a phone housing;
    a cover member attached to said phone housing and pivotable between an open position and a closed position; and
    a signal unit disposed between said phone housing and said cover member that indicates whether said cover member is in said open position or said closed position, said signal unit including:
    a signal emitter attached to said phone housing, a signal receiver attached to said phone housing and spaced from said signal emitter, a baffle attached to said cover member and disposed in the space between said signal emitter and said signal receiver when said cover is in said closed position, and a transmit window attached to the phone housing between said signal emitter and said signal receiver wherein said transmit window is formed of a material having narrow band pass properties.

10. A cellular phone according to claim 9, wherein said transmit window comprises a groove therein shaped corresponding to said baffle for receiving said baffle in said closed position.

11. A cellular phone according to claim 9, wherein said transmit window is formed of LEXAN plastic.

12. A cellular phone according to claim 9, wherein said transmit window is formed of a material that allows about 85% transmission of wavelengths between about 890 nm and about 940 nm.

13. A cellular phone according to claim 12, wherein said transmit window is formed of a material that limits transmission below about 850 nm and above about 980 nm to about 5%.

14. A cellular phone according to claim 9, wherein said signal emitter is an LED indicator.

15. A cellular phone according to claim 14, wherein said cover member comprises an LED exit opening, said LED indicator being disposed in the vicinity of said LED exit opening.

16. A cellular phone according to claim 15, wherein said LED exit opening comprises a cut-out in said cover member.

* * * * *